(12) United States Patent
    Kuefler et al.

(10) Patent No.: US 11,094,282 B1
(45) Date of Patent: Aug. 17, 2021

(54) SYSTEMS AND METHODS FOR MINIMIZING TOUCHSCREEN DISPLAY LATENCY FOR AIRCRAFT

(71) Applicant: Rockwell Collins, Inc., Cedar Rapids, IA (US)

(72) Inventors: Alan M. Kuefler, Marion, IA (US); Amir Beganovic, Cedar Rapids, IA (US); Thomas B. Campbell, Cedar Rapids, IA (US); Brian T. Grunewaldt, Marion, IA (US); Nicolas F. Parilo, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/360,096

(22) Filed: Mar. 21, 2019

(51) Int. Cl.
    *G09G 5/00*    (2006.01)
    *G06F 3/14*    (2006.01)
    *G06F 3/041*   (2006.01)
    *B64D 43/00*   (2006.01)

(52) U.S. Cl.
    CPC .......... *G09G 5/006* (2013.01); *B64D 43/00* (2013.01); *G06F 3/0416* (2013.01); *G06F 3/1423* (2013.01); *G06F 2211/002* (2013.01); *G09G 2320/0252* (2013.01); *G09G 2354/00* (2013.01); *G09G 2370/10* (2013.01); *G09G 2380/12* (2013.01)

(58) Field of Classification Search
    CPC .. G09G 5/006; G09G 2354/00; G06F 3/0416; G06F 3/1423; G06F 2211/002; G06F 15/7867
    See application file for complete search history.

(56) References Cited

U.S. PATENT DOCUMENTS

| | | | | |
|---|---|---|---|---|
| 5,062,106 A | * | 10/1991 | Yamazaki | ........... H04L 12/5601 370/397 |
| 5,261,057 A | * | 11/1993 | Coyle | ................. G06F 13/4059 710/310 |
| 5,274,680 A | * | 12/1993 | Sorton | .................. H04J 3/0632 370/253 |
| 2018/0019861 A1 | * | 1/2018 | Pak | ........................... H04L 1/08 |
| 2018/0039538 A1 | * | 2/2018 | Freikorn | ............. G06F 11/1048 |
| 2019/0196686 A1 | * | 6/2019 | Stulken | ................. G06F 3/0488 |

* cited by examiner

*Primary Examiner* — Yuzhen Shen
(74) *Attorney, Agent, or Firm* — Suiter Swartz pc llo (57) ABSTRACT

A method for reducing touch latency within a user interface of an aircraft display, the method including receiving, by a latency reduction unit, data from the aircraft display, where the data is of one or more data types, entering into one or more queues, by the latency reduction unit, the data based on the one or more data types, and sending, via a bus, the data asynchronously to a display processor of an aircraft display, where sending the data asynchronously includes transmitting the data by packets of data bits at an irregular rate.

16 Claims, 8 Drawing Sheets

SYSTEMS AND METHODS FOR MINIMIZING TOUCHSCREEN DISPLAY LATENCY FOR AIRCRAFT

BACKGROUND

The inventive concepts disclosed herein relate generally to the field of aircraft display systems. More particularly, embodiments of the inventive concepts disclosed herein relate to reducing touchscreen display system latency using an asynchronous transmission architecture.

A contemporary aircraft cockpit includes multiple aircraft display systems, which display to the pilot and co-pilot a wide range of aircraft, flight, navigation, and other information pertaining to the operation and control of the aircraft. An aircraft display system may include a user input system for the pilot and co-pilot to interact with the display system. In many instances, an aircraft display system is federated such that processing and control of the display is coordinated remotely from the display itself. Therefore, a data link, or bus, must exist to transmit data between the display and the display processing computer. Furthermore, as an aircraft display system must minimize weight, the number of data links, or buses, must be minimized and shared to transmit disparate data. For example, a single data bus may transmit display data and user input data.

A key performance characteristic associated with a user input system is the amount of time it takes to receive and respond to user input, referred to as latency. Latency may be large in a federated aircraft display system including a user input system due to the shared data links, or busses, required. Accordingly, in order to overcome the aforementioned limitations, there is a need for a method and a system to reduce latency in a user input system of an aircraft display system.

SUMMARY

In one aspect, the inventive concepts disclosed herein are directed to a method for reducing touch latency within a user interface of an aircraft display. The method includes receiving, by a latency reduction unit, data from the aircraft display, wherein the data is of one or more data types, entering into one or more queues, by the latency reduction unit, the data based on the one or more data types, and sending, via a bus, the data asynchronously to a display processor of an aircraft display, wherein sending the data asynchronously includes transmitting the data by packets of data bits at an irregular rate.

In some embodiments, the method further includes determining if the bus is available, wherein the bus is available when not transmitting the data to the display processor. In some embodiments, the method further includes bypassing the one or more queues and directly sending data received from the aircraft display to the display processor in response to determining the bus is available. In some embodiments, the one or more data types include a first data type and a second data type, wherein the first data type is associated with a user interaction with the user interface, and the second data type is associated with operation of the aircraft display. In some embodiments, the method further includes performing an integrity check on the data. In some embodiments, the integrity check includes verifying a parity of the data. In some embodiments, the method further includes clearing a specific queue of the one or more queues associated with the data based on the integrity check.

In a further aspect, the inventive concepts disclosed herein are directed to a low latency user interface for an aircraft. The user interface includes a display, a bus, and a processing circuit coupled to the display. The processing circuit includes a processor or logic and a memory. The memory has instructions stored thereon that, when executed by the processor or logic, cause the processor or logic to receive, from the display, display data, where the display data is of a first data type or a second data type, where the first data type is associated with a user interaction with the user interface and the second data type is associated with operation of the display. The memory further has instructions stored thereon that, when executed by the processor or logic, cause the processor or logic to enter into a first queue the display data of the first data type, enter into a second queue the display data of the second data type, and send, via the bus, the display data asynchronously to a display processor.

In some embodiments, the memory further includes instructions to cause the processor or logic to determine if the bus is available, where the bus is available when not transmitting the display data to the display processor. In some embodiments, the memory further includes instructions to cause the processor or logic to bypass the first queue and directly send the display data of the first data type to the display processor in response to determining the bus is available. In some embodiments, the memory further includes instructions to cause the processor or logic to bypass the second queue and directly send the display data of the second data type to the display processor in response to determining the bus is available. In some embodiments, the memory further includes instructions to cause the processor or logic to perform an integrity check on the display data. In some embodiments, the integrity check verifies a parity of the display data. In some embodiments, the memory further includes instructions to cause the processor or logic to clear the first queue based on the integrity check. In some embodiments, the memory further includes instructions to cause the processor or logic to clear the second queue based on the integrity check. In some embodiments, sending the display data asynchronously includes conveying the display data by packets of data bits at an irregular rate.

In a further aspect, the inventive concepts disclosed herein are directed to a latency reduction unit for a user interface of an aircraft display. The latency reduction unit includes a processing or logic circuit, the processing or logic circuit includes a processor or logic and memory. The memory has instructions stored thereon that, when executed by the processor or logic, cause the processor or logic to receive, from the aircraft display, display data, where the display data is of a first data type or a second data type, where the first data type is associated with a user interaction with the user interface and the second data type is associated with operation of the aircraft display. The memory has further instructions stored thereon that, when executed by the processor or logic, cause the processor or logic to enter into a first queue the display data of the first data type, enter into a second queue the display data of the second data type, and send, via the bus, the display data asynchronously.

In some embodiments, the memory further includes instructions to cause the processor or logic to determine if the bus is available, where the bus is available when not transmitting the display data, bypass the first queue and directly send the display data of the first data type in response to determining the bus is available, and bypass the second queue and directly send the display data of the second data type in response to determining the bus is available. In some embodiments, the memory further includes instructions to cause the processor or logic to perform an integrity check to verify a parity of the display data. In some embodiments, the integrity check verifies a parity of the display data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for minimizing touchscreen display latency for aircraft. The inventive concepts disclosed herein can be utilized in a number of display systems for various types of transmission data. While the present disclosure describes systems and methods implementable for an aircraft touchscreen display, the inventive concepts disclosed herein may be used in any type of environment (e.g., in another aircraft, a spacecraft, a ground-based vehicle, or in a non-vehicle application such as a ground-based federated display system, a federated air traffic control system, a federated radar system, a federated virtual display system, or any other system that requires efficient transmission of data via a limited number of data links or busses). While certain examples and embodiments of the inventive concepts disclosed herein are described with respect to an aircraft touchscreen display, it will be appreciated that user input systems other than a touchscreen may use and benefit from the inventive concepts disclosed herein with respect to other vehicles, systems, and objects.

Figure 1:
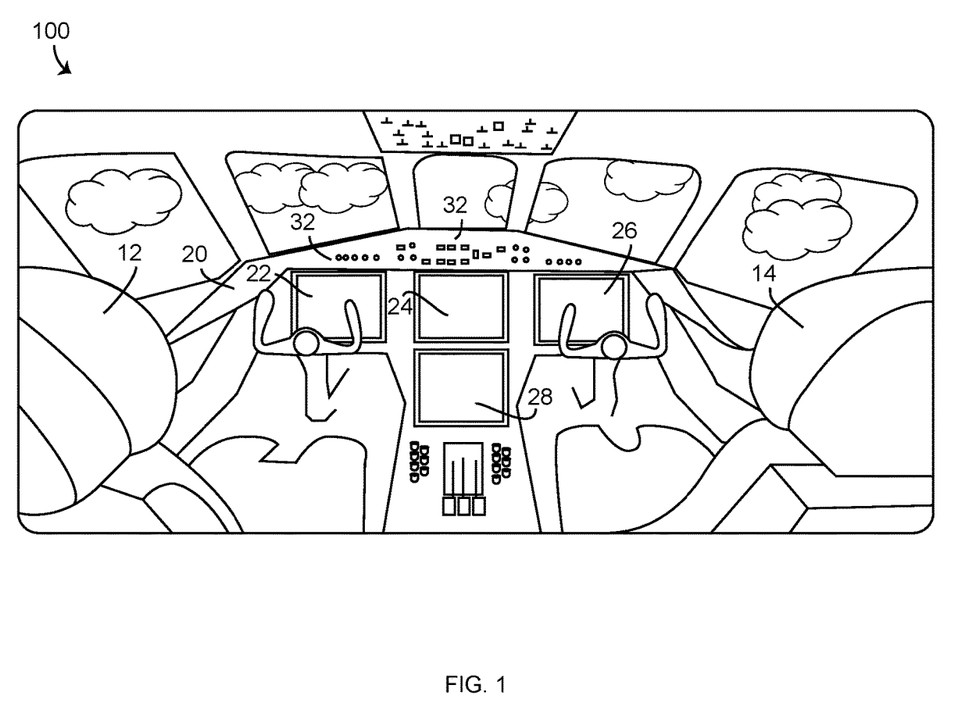
FIG. 1 is a schematic illustration of an exemplary embodiment of a cockpit of an aircraft according to the inventive concepts disclosed herein.

Referring now to FIG. 1, a cockpit 100 of an airplane is shown. The cockpit 100 includes a seat 12 on a left side of the cockpit 100 for a pilot to be seated and a seat 14 on a right side of the cockpit 100 for a co-pilot to be seated. The cockpit 100 further includes a dashboard 20 including various flight/cockpit instruments 32 such as engine instruments, navigational equipment, and communication equipment. The dashboard 20 further includes aircraft displays 22-28 that are positioned in front of the pilot and co-pilot and provides them with information to aid in flying the aircraft. In an exemplary embodiment of the present disclosure, the aircraft display 22 is positioned in front of the pilot seat 12 so that the pilot seated on the seat 12 can view information pertaining to the flight/aircraft on the aircraft display 22 and similarly, the aircraft display 26 is positioned in front of the co-pilot seat 14 so that the co-pilot seated on the seat 14 can view information pertaining to the flight/aircraft on the aircraft display 26.

The aircraft displays 22-28 include, but are not limited to primary flight display (PFD) and multi-function display (MFD). The primary flight display (PFD) displays all information critical to flight, including calibrated airspeed, altitude, heading, vertical speed and the like. The PFD is designed to improve a pilot's situational awareness by integrating this information into a single display instead of six different analog instruments, thus reducing the amount of time necessary to monitor the instruments. The PFDs also increase situational awareness by alerting the pilots to unusual or potentially hazardous conditions, for example, low airspeed, high rate of descent, by changing the color or shape of the display or by providing audio alerts. The multi-function display (MFD) displays navigational and weather information from multiple systems. The MFDs are most frequently designed as "chart-centric," where the pilot can overlay different information over a map or chart. The MFD can also be used to view other non-overlay type data (e.g., current route plan) and calculated overlay type data (e.g., the glide radius of the aircraft, given current location over terrain, winds, and aircraft speed and altitude). The MFDs can also display information about aircraft systems, such as fuel and electrical systems. Similar to the PFD, the MFD can change the color or shape of the data to alert the pilots to hazardous situations.

The aircraft displays 22-28 may be touch controlled displays that can be used by the pilot or co-pilot to interact with aircraft systems by touching the display screen with a stylus/pen and/or one or more fingers. For example, a tap of the display unit 28 by a pilot, brings up a context-sensitive menu that let the pilot control things such as speed, altitude and heading of the aircraft. In a further embodiment of the invention, the touch controlled displays are multi-touch controlled such that the aircraft displays 22-28 are operative to detect a simultaneous presence of more than one point of contact (i.e., multiple contacts) on the display surface. Such multi-touch enabled display surfaces are also known as gesture-controlled display surfaces. The aircraft displays 22-28, being multi-touch enabled, can detect various known gestures such as tap, double tap, pinch, zoom, rotate, long press, pan, scroll, flick, two finger tap, two finger scroll, to name a few. For example, the pilot can input a gesture such as a couple of taps on the aircraft display 28, by which the screen layout can be split into two, three, or four windows and the elements of the individual windows can be customized by dragging and dropping icons to provide new information. The touch controlled interface of the aircraft displays 22-28 makes the cockpit more user-friendly.

Figure 2:
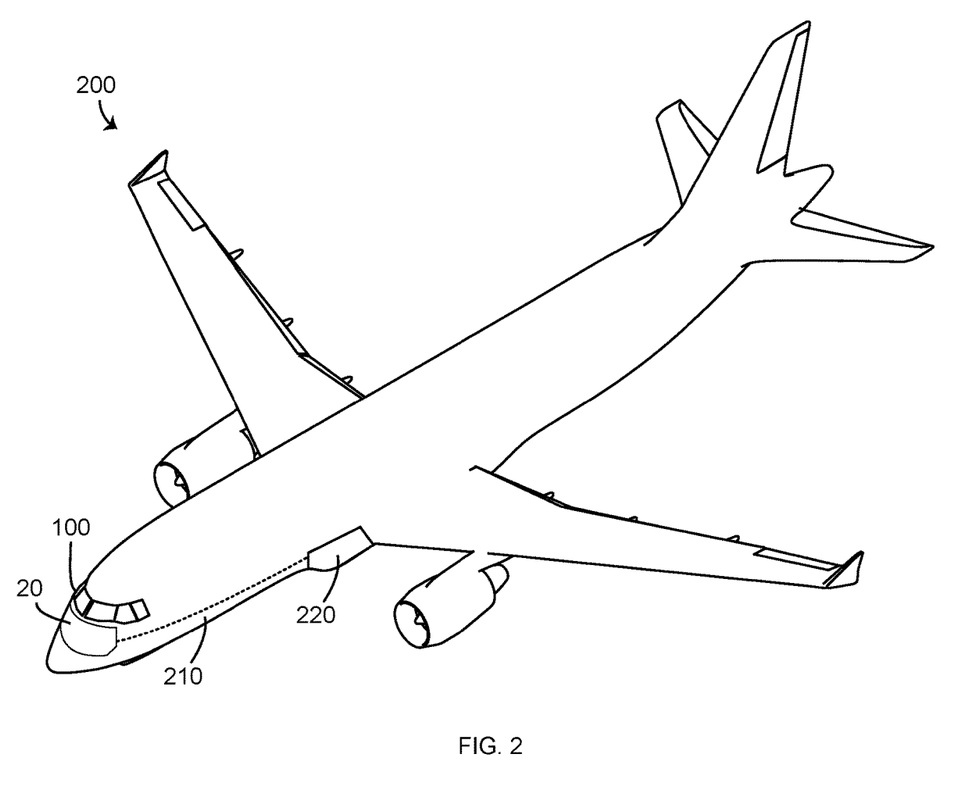
FIG. 2 is a schematic illustration of a federated aircraft display system positioned within the aircraft of FIG. 1.

Referring now to FIG. 2, a schematic illustration of a federated aircraft display system 200 is shown. The federated aircraft display system 200 may include a display processing computer 220 at a location remote of cockpit 100. In some embodiments, a remotely located display processing computer 220 allows other instruments or components to be positioned within cockpit 100 or allows for easy access to display processing computer 220, by a service technician, for example. In some embodiments, display processing computer 220 processes and/or controls aircraft displays 22-28.

Display processing computer 220 may connect to dashboard 20 and aircraft displays 22-28 via bus 210. Bus 210 may transmit or otherwise convey data between one or more aircraft displays (e.g., aircraft displays 22-28) and one or more corresponding display processing computers (e.g., display processing computer 220). Bus 210 may be a wire, Ethernet, fiber optic, CAN bus, coaxial cable, or any other data-transmitting connection known in the art. The number and/or size of bus 210 may be limited due to weight constraints of the aircraft. For example, bus 210 may be a RS-422 connection. In some embodiments, bus 210 may transmit a plurality of data types via a single connection. For example, bus 210 may transmit input data from a touchscreen and display data from a display source via a RS-422 connection. Bus 210 may be a parallel and/or a serial connection. Furthermore, bus 210 may use a variety of communication protocols. For example, bus 210 may be configured as SATA, PCIe, VC, RS-232, HyperTransport, RS-422, SPI, or any other connection/protocol known in the art.

Figure 3:
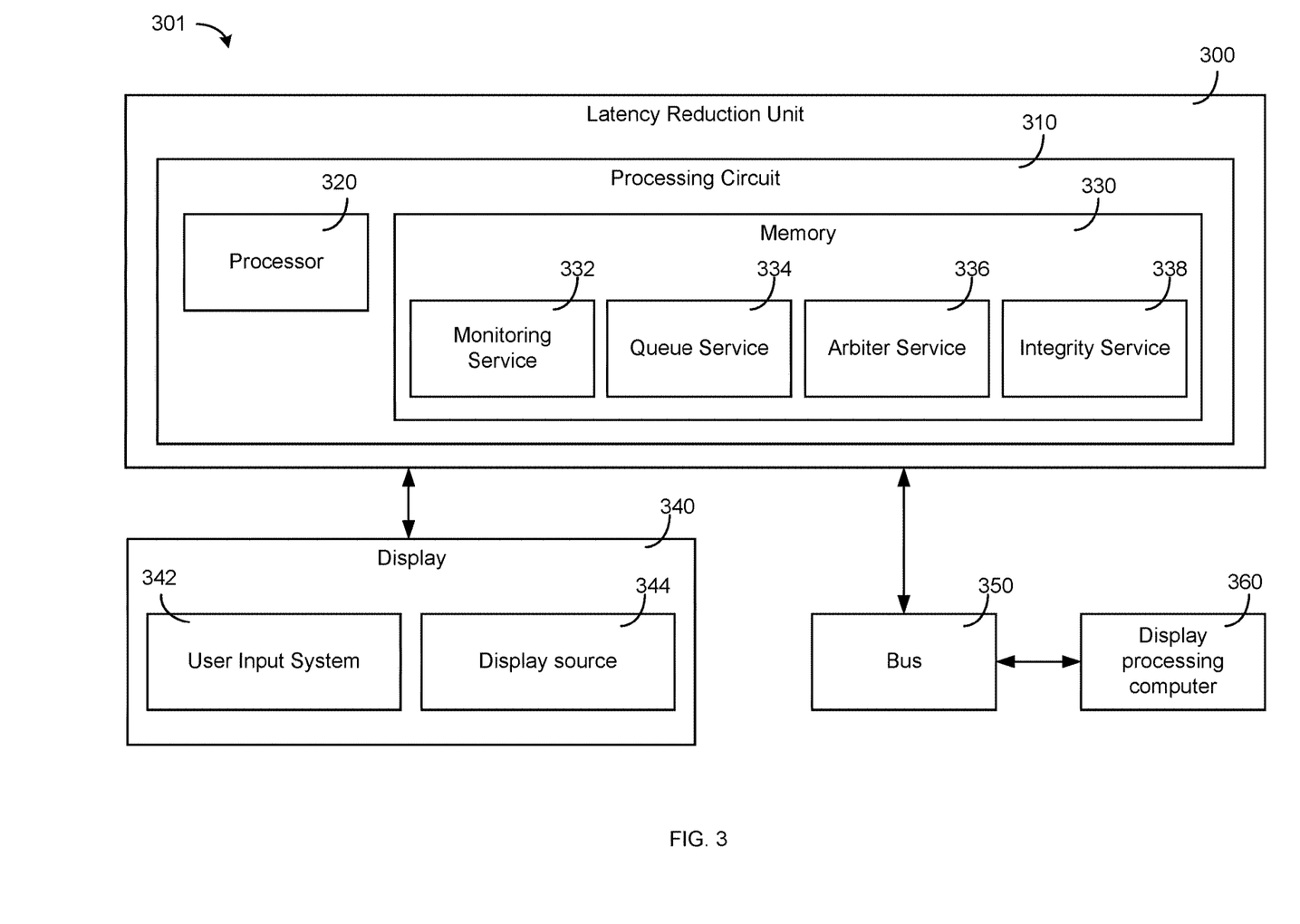
FIG. 3 is a block diagram of an exemplary embodiment of a latency reduction unit for the aircraft display system of FIG. 2.

Referring now to FIG. 3, a block diagram of an exemplary embodiment of a latency reduction unit 300 for an aircraft display system 301 is shown. Latency reduction unit 300 may reduce a latency, or the amount of time it takes to receive and respond to user input, associated with one or more of aircraft displays 22-28. Latency reduction unit 300 may increase the efficiency of bus 210, and therefore reduce latency, by sending data from a display source (e.g., aircraft displays 22-28) to a display processing computer (e.g., display processing computer 220) asynchronously. In some embodiments, latency reduction unit 300 may be coupled to or integrated within aircraft displays 22-28. In some embodiments, latency reduction unit 300 may be coupled to or integrated within display processing computer 220. In some embodiments, latency reduction unit 300 may be a fully integrated system. For example, latency reduction unit 300 may include a display source (e.g., aircraft displays 22-28) and a display processing computer (e.g., display processing computer 220).

Aircraft display system 301 may include a display 340. Display 340 may be one of aircraft displays 22-28 or a different display altogether. Display 340 may present visual information to a pilot and/or co-pilot of an aircraft and may receive user input therefrom, as described in detail with reference to FIG. 1. Furthermore, display 340 may produce and transmit data including one or more data types to latency reduction unit 300. In some embodiments, display 340 includes a display source 344 and a user input system 342. Display source 344 may be configured to present visual media (LED light, text, graphics, etc.) via light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), and/or any other suitable display technology. In some embodiments, display source 344 may be a touchscreen display.

User input system 342 may be configured to receive input from a user, as described in detail with reference to FIG. 1. For example, user input system 342 may be configured to detect touch and other gestures of a user. In this regard, the user input system 342 may be configured with a touch-sensitive panel layered on top of an electronic visual display (i.e., display source 344). User input system 342 may use a variety of touch-sensing technologies configured to receive a user input, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, and/or any other suitable touch-sensitive technology. In some embodiments, user input system 342 is a touchscreen.

Aircraft display system 301 may include display processing computer 360 connected to latency reduction unit 300 via bus 350. Display processing computer 360 may process data from display 340 and provide data to display 340. For example, display processing computer 360 may receive touch data from display 340 and in response control display 340 to display a new interface. Data may be transmitted to display processing computer 360 via bus 350 as controlled by latency reduction unit 300. Bus 350 may transmit or otherwise convey data between latency reduction unit 300 and display processing computer 360 as described in detail with reference to FIG. 2. In some embodiments, display processing computer 360 includes a display processor to carry out functions described with respect to the display processing computer 360.

Still referring to FIG. 3, latency reduction unit 300 is shown to include processing circuit 310. Processing circuit 310 may include processor 320 and memory 330. Processor 320 may be implemented as a specific purpose processor, an application specific integrated circuit (ASIC), one or more field programmable gate arrays (FPGAs), a group of processing components, or other suitable electronic processing or logic components. Memory 330 is one or more devices (e.g., RAM, ROM, flash memory, hard disk storage, registers) for storing data and computer code for completing and facilitating the various user or client processes, layers, and modules described in the present disclosure. Memory 330 may be or include volatile memory or non-volatile memory and may include database components, object code components, script components, or any other type of information structure for supporting the various activities and information structures of the inventive concepts disclosed herein. Memory 330 is communicably connected to processor 320 and includes computer code or instruction modules for executing one or more processes described herein.

Memory 330 can include various modules and/or services that cause processor 320 to execute the systems and methods described herein. Memory 330 can include monitoring service 332, queue service 334, arbiter service 336, and integrity service 338. Monitoring service 332 may determine the availability of bus 350. For example, monitoring service 332 may determine bus 350 to be available when bus 350 is not transmitting data between latency reduction unit 300 and display processing computer 360. In some embodiments, monitoring service 332 monitors one or more flags or registers of latency reduction unit 300. For example, monitoring service 332 may determine bus 350 is unavailable when a 1-bit bus lock register holds a binary value of true. Monitoring service 332 may continuously check the availability of bus 350 or may be triggered to by another process.

Queue service 334 may buffer data sent from display 340 to display processing computer 360 by entering data received from display 340 into one or more queues. Queue service 334 may maintain a plurality of queues, each queue holding a different data type. For example, a first queue may hold input data and a second queue may hold display data. Queue service 334 may be configured to be a simple queue, circular queue, priority queue, double ended queue or any other queue architecture known in the art. Queue service 334 may uniquely control the size of each queue in the plurality of queues in response to a quantity and type of data being buffered. In some embodiments, the size of the one or more queues is predetermined and fixed. For example, a first queue to buffer input data may be 50-bits while a second queue to buffer display data may be 550-bits.

Arbiter service 336 may coordinate use of bus 350 to send data asynchronously to display processing computer 360. In some embodiments, arbiter service 336 coordinates transmission of one or more data types via a single bus (e.g., bus 350). For example, arbiter service 336 may send input data and display data from display 340 via bus 350 to display processing computer 360. Arbiter service 336 may send data asynchronously (e.g., not in a scheduled manner). Conventional federated aircraft display systems may send disparate data types in a synchronous, or scheduled manner (i.e., on a recurring time basis), while arbiter service 336 may send disparate data types in an asynchronous, or unscheduled manner (i.e., as soon as bus 350 is available). Sending data asynchronously can provide a significant reduction in latency.

Arbiter service 336 may receive data from display 340 and/or from queue service 334. In some embodiments, arbiter service 336 couples to monitoring service 332 to determine when bus 350 is available to transmit data. For example, arbiter service 336 may idle until monitoring service 332 indicates that bus 350 is available, then may send data queued in queue service 334 to display processing computer 360. In some embodiments, arbiter service 336 sends data directly from display 340 to display processing computer 360, as described in detail with reference to FIG. 5. For example, arbiter service 336 may receive data from display 340, receive an indication that bus 350 is available from monitoring service 332 and transmit the received data to display processing computer 360 without queue service 334 buffering the data.

Integrity service 338 may test data received from display 340 for errors by performing an integrity check. Integrity service 338 may be configured to verify a parity of data received from display 340. In some embodiments, data received from display 340 includes a parity bit. In some embodiments, integrity service 338 determines data received from display 340 to be valid if the data is of an even parity (i.e., containing an even number of binary ones). Integrity service 338 may use a variety of error detection schemes, such as repetition codes, parity bits, checksums, cyclic redundancy checks (CRCs), cryptographic hash functions, or error-correcting codes, to name a few. Furthermore, integrity service 338 may use a specific error detection scheme, or combination thereof, for specific data types received from display 340. For example, integrity service 338 may check first input data via a parity check and check second display data via a checksum. In some embodiments, integrity service 338 is coupled to one or more components of latency reduction unit 300 to perform the processes and methods described in detail below with reference to FIGS. 4-7.

Figure 4:
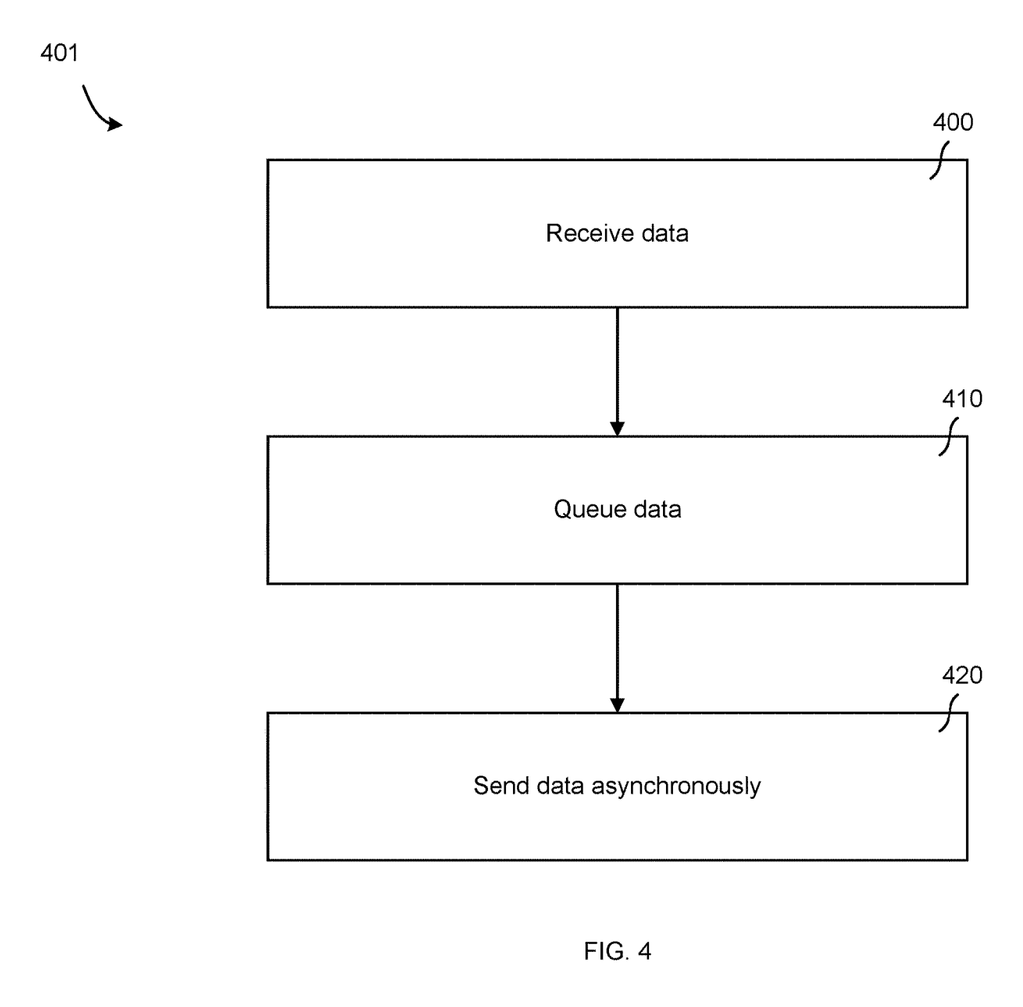
FIG. 4 is a diagram of an exemplary embodiment of a method for reducing touchscreen latency in an aircraft display system, according to the inventive concepts disclosed herein.

Referring now to FIG. 4, a diagram of a method 401 for reducing touchscreen latency in an aircraft display system is shown according to the inventive concepts disclosed herein. Method 401 includes steps 400-420 of receiving data, queuing data, and sending data asynchronously. In some embodiments, method 401 is implemented by latency reduction unit 300 or one or more components thereof. In some embodiments, method 401 includes one or more timeouts which reset operation of method 401 if no action is taken in a designated amount of time (e.g., 15 seconds). For example, method 401 may reset to step 400 from step 410 if data remains in a queue beyond a timeout period. In some embodiments, one or more instances of method 401 may exist in parallel.

Step 400 may include receiving data from display 340. In some embodiments, one or more data types are received from display 340 and processed in one or more instances of method 401. For example, first input data may be received from display 340 and processed by a first instance of method 401 while second display data may be received from display 340 and processed by a second instance of method 401.

Step 410 may buffer the data received in step 400 by entering the data into one or more queues. In some embodiments, step 410 is implemented by queue service 334 of latency reduction unit 300. Step 410 may queue the data received in step 400 in any manner described in detail with reference to FIG. 3. For example, data may be queued in a first-in-first-out (FIFO) register of latency reduction unit 300. In some embodiments, step 410 further checks for errors in the data received in step 400. For example, step 410 can check for errors via integrity service 338 as described in detail with reference to FIG. 3.

Step 420 may send the data queued in step 400 asynchronously via bus 350 to display processing computer 360. In some embodiments, step 420 is implemented by arbiter service 336. Conventional methods and systems may send data in a synchronous, or scheduled manner (i.e., on a recurring time basis), however step 420 may send data in an asynchronous, or unscheduled manner (i.e., as soon as bus 350 is available). Sending data asynchronously can provide a significant reduction in latency. In some embodiments, step 420 may be configured to send data queued in step 400 asynchronously in response to monitoring service 332 determining an availability of bus 350.

Figure 4A:
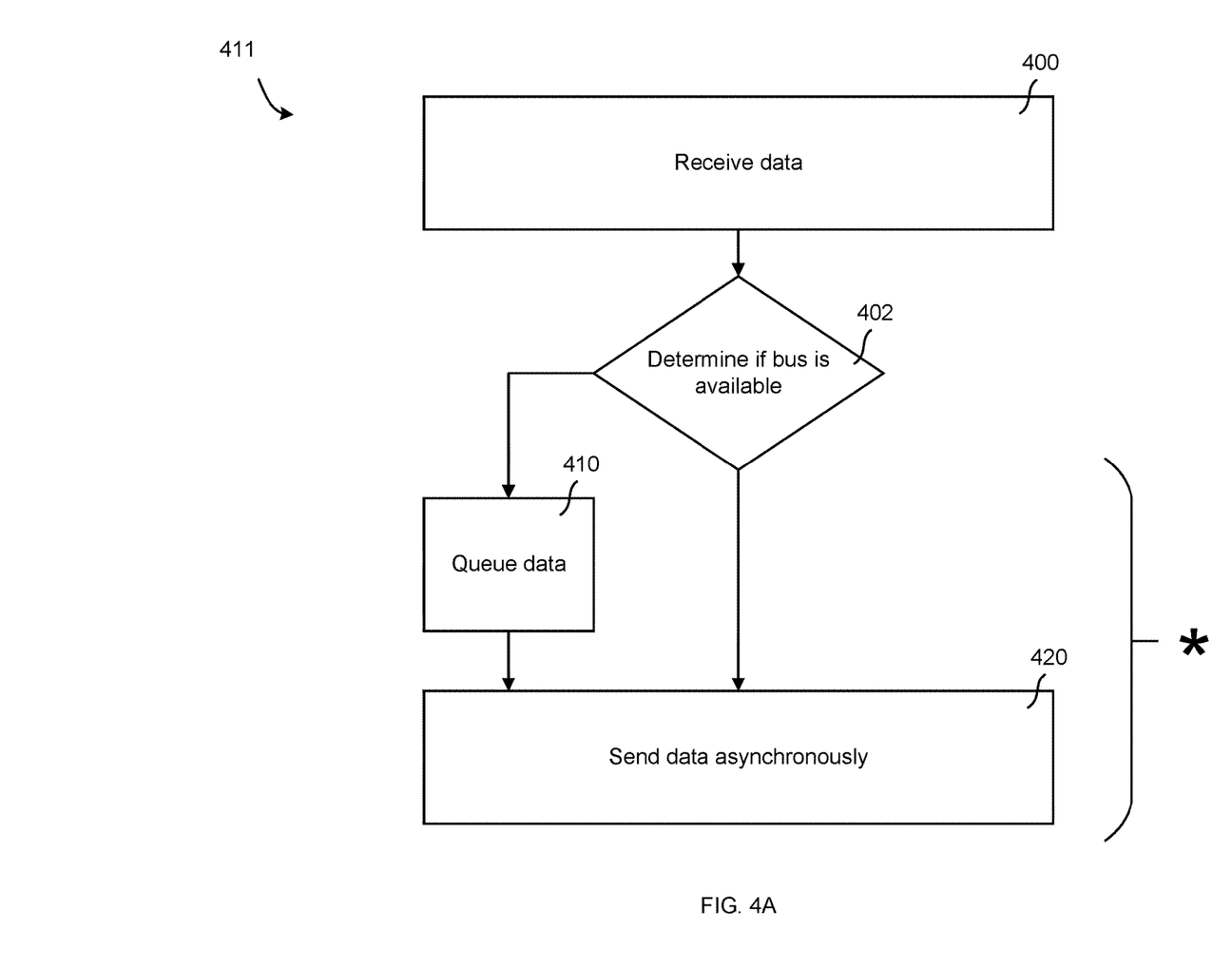
FIG. 4A is a diagram of the method of FIG. 4 including a queue bypass method, according to the inventive concepts disclosed herein.

Referring now to FIG. 4A, the method of FIG. 4 including a queue bypass method 411 is shown, according to an exemplary embodiment. In some embodiments, method 411 may allow for further reduced latency as compared to method 401 by directly sending data received from display 340 to display processing computer 360 without entering the data into a queue. At step 402, monitoring service 332 may determine an availability of bus 350 and cause selective execution of step 410 or step 420. In some embodiments, if monitoring service 332 determines bus 350 is available, method 411 will directly execute step 420 and send data asynchronously to display processing computer 360 without queueing the data. In some embodiments, if monitoring service 332 determines bus 350 is unavailable, method 411 will execute step 410 and enter the data into one or more queues. In some embodiments, integrity service 338 checks the data received from display 340 for errors at step 410.

Figure 4B:
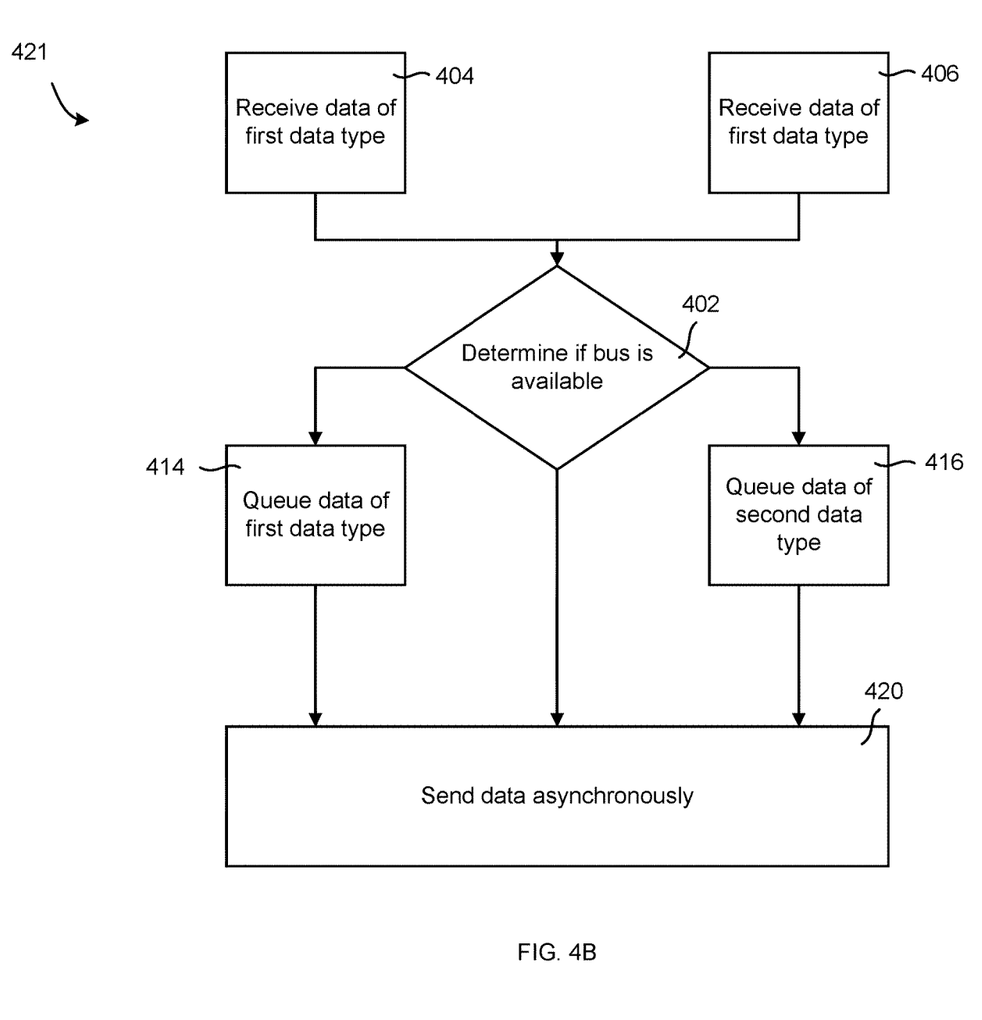
FIG. 4B is a diagram of the method of FIG. 4A including multiple data types, according to the inventive concepts disclosed herein.

Referring now to FIG. 4B, the method of FIG. 4 including a first data type and a second data type method 421 is shown, according to an exemplary embodiment. In some embodiments, latency reduction unit 300 may receive one or more data types from display 340 and process the one or more data types via one or more parallel processes that share a common bus 350 with which to send the one or more data types. For example, latency reduction unit 300 may receive first input data and process the first input data via a first method 401 and send the first data via a first bus 350 and in parallel (i.e., at the same or similar time) receive second display data and process the second display data via a second method 401 and send the second data via the first bus 350.

At step 404-406, latency reduction unit 300 may receive a first data type and a second data type. In some embodiments, the first data type is associated with a user interaction with display 340, and the second data type is associated with operation of the display 340. At step 402, monitoring service 332 may determine an availability of bus 350. In some embodiments, step 402 may occur twice, once in response to step 404 and once in response to step 406. Step 402 may determine if data of the first data type and data of the second data type are entered into a first queue and a second queue respectively, or if data of the first data type and data of the second data type are sent asynchronously to display processing computer 360 without being entered into a first queue or a second queue respectively. For example, first input data may be received from display 330 followed by second display data. To continue the example, the first input data may be sent directly to display processing computer 360 without being entered into a first queue while second display data may be entered into a second queue to buffer before being sent to display processing computer 360 while bus 350 is unavailable because of transmitting first input data. At step 420, data (e.g., data of first data type or data of second data type) is sent asynchronously via bus 350 to display processing computer 360 as described in detail with reference to FIG. 4.

Figure 5:
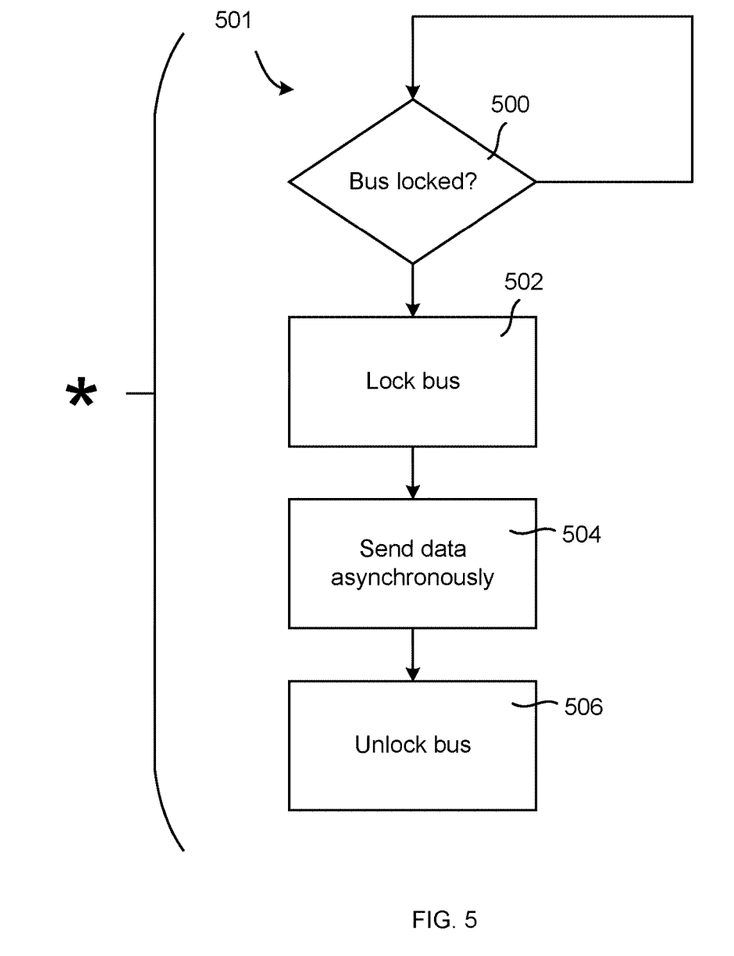
FIG. 5 is a diagram of an exemplary embodiment of a method for bus arbitration, according to the inventive concepts disclosed herein.

Referring now to FIG. 5, a method 501 of bus arbitration is shown, according to an exemplary embodiment. Method 501 may coordinate use of bus 350. In some embodiments, method 501 coordinates use of bus 350 between a first instance of method 401 configured to receive first input data and a second instance of method 401 configured to receive second display data. In some embodiments, method 501 coordinates use of bus 350 between a plurality of processes or methods of latency reduction unit 300. For example, method 501 may be implemented in method 411, as shown in FIG. 5.

At step 500, arbiter service 336 may determine an availability of bus 350. In some embodiments, arbiter service 336 may check a "bus locked" register that may hold a binary value of one to indicate bus 350 is unavailable and a binary value of zero to indicate bus 350 is available. Step 500 may wait for bus 350 to become available to execute step 502. In some embodiments, while waiting for bus 350 to become available arbiter service 336 may check the availability of bus 350 periodically (i.e., at regular time intervals).

At step 502, arbiter service 336 may "lock" bus 350. In some embodiments, arbiter service 336 locks bus 350 by storing a binary value of one in a "bus locked" register. At step 504, arbiter service 336 may send data asynchronously as described in detail with reference to FIG. 4. At step 506, arbiter service 336 may "unlock" bus 350. In some embodiments, arbiter service 336 unlocks bus 350 by storing a binary value of zero in a "bus locked" register.

Figure 6:
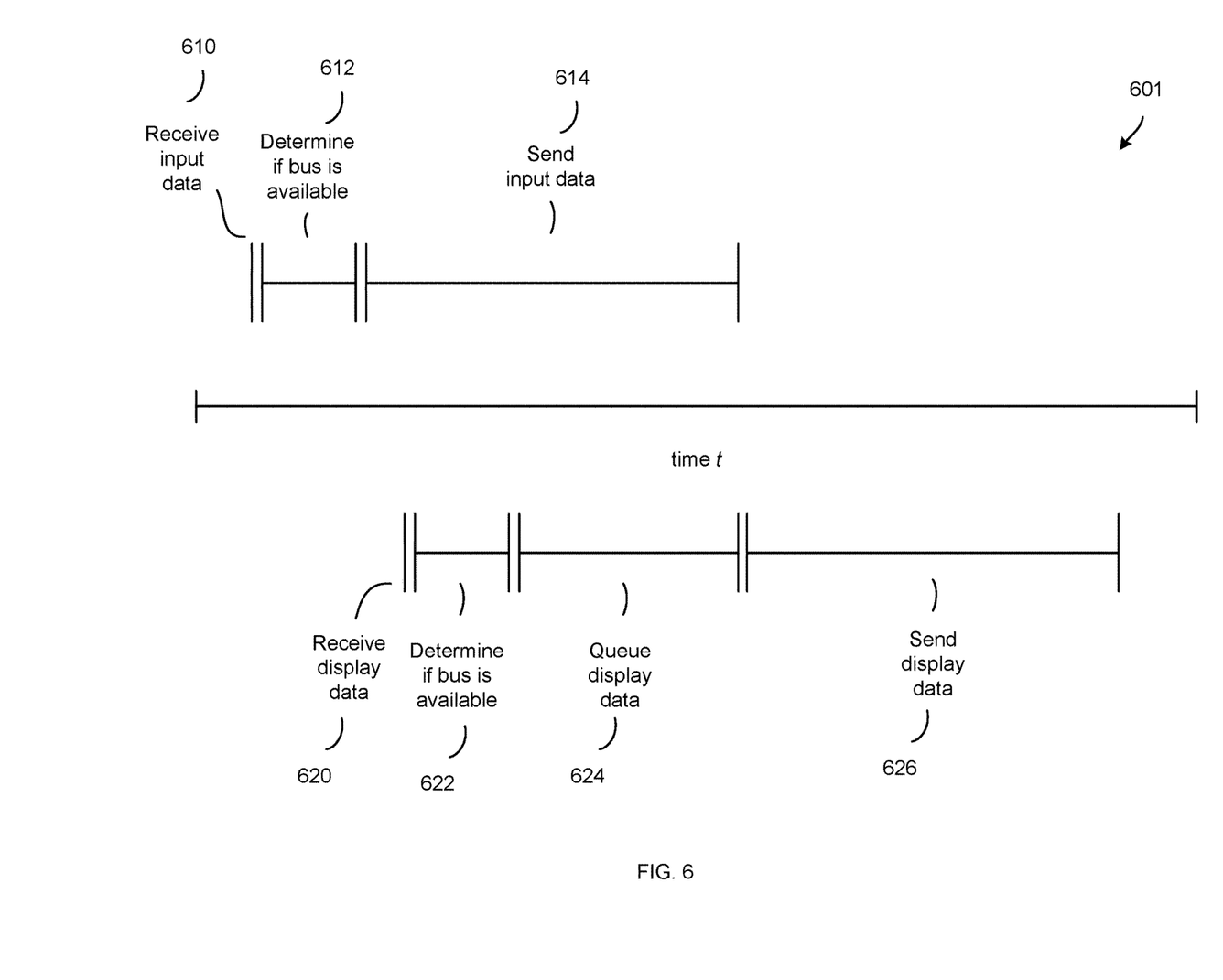
FIG. 6 is an illustrative example of the method of FIG. 4 for reducing touchscreen latency in an aircraft display system, according to the inventive concepts disclosed herein.

Referring now to FIG. 6, an illustrative example 601 of the method of FIG. 4 is shown, according to an exemplary embodiment. At instant 610, latency reduction unit 300 receives input data. At instant 612, latency reduction unit 300 determines bus 350 is available. At instant 614 and in response to determining bus 350 is available, latency reduction unit 300 sends the input data via bus 350 to display processing computer 360. At instant 620, during the time latency reduction unit 300 is sending the input data via bus 350 to display processing computer 360, latency reduction unit 300 further receives display data. At instant 622, latency reduction unit 300 determines bus 350 is unavailable. At instant 624 and in response to determining bus 350 is unavailable, latency reduction unit 300 enters the display data into a queue. At instant 626 and in response to latency reduction unit 300 determining bus 350 is available, latency reduction unit sends the display data from the queue to display processing computer 360 via bus 350.

As will be appreciated from the above, systems and methods for minimizing touchscreen display latency for aircraft according to embodiments of the inventive concepts disclosed herein may reduce latency in an aircraft user interface and allow a pilot to efficiently interact with aircraft display systems.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for reducing touch latency within a user interface of an aircraft display, the method comprising:
    receiving, by a latency reduction unit, data from the aircraft display, wherein the data is of one or more data types;
    entering into one or more queues, by the latency reduction unit, the data based on the one or more data types;
    determining if the bus is available, wherein the bus is available when not transmitting the data to the display processor;
    bypassing the one or more queues and directly sending data received from the aircraft display to the display processor in response to determining the bus is available; and
    sending, via a bus, the data asynchronously to a display processor of an aircraft display, wherein sending the data asynchronously comprises transmitting the data by packets of data bits at an irregular rate.

2. The method of claim 1, the one or more data types comprising a first data type and a second data type, wherein the first data type is associated with a user interaction with the user interface, and the second data type is associated with operation of the aircraft display.

3. The method of claim 1, the method further comprising performing an integrity check on the data.

4. The method of claim 3, the integrity check comprising verifying a parity of the data.

5. The method of claim 3, the integrity check comprising performing a cyclic redundancy check (CRC) verifying the data.

6. The method of claim 3, the method further comprising clearing a specific queue of the one or more queues associated with the data based on the integrity check.

7. A low latency user interface for an aircraft, comprising:
    a display;
    a bus;
    a processing circuit coupled to the display, the processing circuit comprising a processor and a memory, the memory having instructions stored thereon that, when executed by the processor, cause the processor to:
        receive, from the display, display data, wherein the display data is of a first data type or a second data type, wherein the first data type is associated with a user interaction with the user interface and the second data type is associated with operation of the display;
        enter into a first queue the display data of the first data type;
        enter into a second queue the display data of the second data type;
        determine if the bus is available, wherein the bus is available when not transmitting the display data to the display processor;
        bypass the first queue and directly send the display data of the first data type to the display processor in response to determining the bus is available; and
        send, via the bus, the display data asynchronously to a display processor.

8. The user interface of claim 7, the memory further comprising instructions to cause the processor to bypass the second queue and directly send the display data of the second data type to the display processor in response to determining the bus is available.

9. The user interface of claim 7, the memory further comprising instructions to cause the processor to perform an integrity check on the display data.

10. The user interface of claim 9, wherein the integrity check verifies a parity of the display data.

11. The user interface of claim 9, the memory further comprising instructions to cause the processor to clear the first queue based on the integrity check.

12. The user interface of claim 9, the memory further comprising instructions to cause the processor to clear the second queue based on the integrity check.

13. The user interface of claim 7, wherein sending the display data asynchronously comprises conveying the display data by packets of data bits at an irregular rate.

14. A latency reduction unit for a user interface of an aircraft display, the latency reduction unit comprising:
    a processing circuit, the processing circuit comprising:
    a processor; and
    memory, the memory having instructions stored thereon that, when executed by the processor, cause the processor to:
        receive, from the aircraft display, display data, wherein the display data is of a first data type or a second data type, wherein the first data type is associated with a user interaction with the user interface and the second data type is associated with operation of the aircraft display;
        enter into a first queue the display data of the first data type;
        enter into a second queue the display data of the second data type;
        determine if the bus is available, wherein the bus is available when not transmitting the display data;
        bypass the first queue and directly send the display data of the first data type in response to determining the bus is available;

bypass the second queue and directly send the display data of the second data type in response to determining the bus is available; and send, via the bus, the display data asynchronously.

15. The latency reduction unit of claim 14, the memory further comprising instructions to cause the processor to perform an integrity check to verify a parity of the display data.

16. The latency reduction unit of claim 14, the memory further comprising instructions to cause the processor to perform a cyclic redundancy check (CRC) to verify the display data.

* * * * *